United States Patent
Scheinecker et al.

(10) Patent No.: US 10,428,224 B2
(45) Date of Patent: Oct. 1, 2019

(54) LOW GLOSS POWDER COATING

(71) Applicant: TIGER DRYLAC U.S.A. INC., St. Charles, IL (US)

(72) Inventors: Wolfgang Scheinecker, Wels (AT); Konrad Sebastian Binter, Wels (AT)

(73) Assignee: TIGER DRYLAC U.S.A. INC., St. Charles, IL (US)

( * ) Notice: Subject to any disclaimer, the term of this patent is extended or adjusted under 35 U.S.C. 154(b) by 0 days.

(21) Appl. No.: 15/603,690

(22) Filed: May 24, 2017

(65) Prior Publication Data
US 2018/0340078 A1 Nov. 29, 2018

(51) Int. Cl.
C09D 5/03 (2006.01)
C09D 127/14 (2006.01)
C09D 129/10 (2006.01)
C09D 7/62 (2018.01)

(52) U.S. Cl.
CPC ............ *C09D 5/032* (2013.01); *C09D 5/033* (2013.01); *C09D 7/62* (2018.01); *C09D 127/14* (2013.01); *C09D 129/10* (2013.01)

(58) Field of Classification Search
None
See application file for complete search history.

(56) References Cited

U.S. PATENT DOCUMENTS

| | | | |
|---|---|---|---|
| 4,122,055 A | 10/1978 | Tugukuni et al. | |
| 5,104,955 A | 4/1992 | Mathai | |
| 6,825,258 B2 | 11/2004 | Steckel | |
| 7,034,075 B1 | 4/2006 | Torborg et al. | |
| 7,153,907 B2* | 12/2006 | Asakawa | C09D 127/12 525/123 |
| 7,816,421 B2 | 10/2010 | Moens et al. | |
| 8,969,577 B2 | 3/2015 | Nesvadba et al. | |
| 9,012,556 B1* | 4/2015 | Mahn | C09D 7/1216 524/456 |
| 9,206,320 B1 | 12/2015 | Daly et al. | |
| 2010/0189905 A1 | 7/2010 | Nakahara et al. | |
| 2012/0270055 A1 | 10/2012 | Sheng et al. | |

FOREIGN PATENT DOCUMENTS

| | | |
|---|---|---|
| EP | 0371599 | 6/1990 |
| EP | 1316593 | 6/2003 |
| EP | 1422269 | 5/2004 |
| EP | 1443086 | 8/2004 |
| EP | 2635646 | 7/2015 |
| GB | 1523903 | 9/1978 |
| WO | WO 2015/005434 | 1/2015 |

OTHER PUBLICATIONS

International Search Report and Written Opinion issued in International Patent Application No. PCT/US2018/034392, dated Aug. 9, 2018.

* cited by examiner

*Primary Examiner* — Vu A Nguyen
(74) *Attorney, Agent, or Firm* — Norton Rose Fulbright US LLP

(57) ABSTRACT

This disclosure relates to a curable, matte, preferably dull-matte, powder coating composition, accommodating superior chemical resistance through a complex of cross linkable fluoro containing organic compounds (A), preferably fluoro containing oligomers and/or polymers, and one or more cross linker(s) (B) able to react with (A), wherein the powder coating formulation additionally comprises one or more compound(s) (C) able to react with (A) and/or (B).

15 Claims, No Drawings

LOW GLOSS POWDER COATING

FIELD OF THE INVENTION

The present invention relates to powder coating formulations, particularly powder coating compositions having improved chemical resistance and matte surfaces and high weather resistance.

BACKGROUND

The desire for resilient powder coatings is becoming increasingly popular. Today, there are well known basic powder chemistries that have been utilized over the past several decades that meet standard durability requirements. However, most powder chemistries available in the current industry are not equipped with the appropriate chemical makeup for extreme situations or environments. As this form of ultra-durable powder coating becomes more prevalent, innovations of the chemical makeup of typical powder coating chemistries is in high demand.

Today, there are several well-known chemical makeups known in the industry that are defined as durable powder coatings. Examples of known durable powder chemistries include: polyester, polyester/isocyanate, acrylic and fluoropolymer powder coatings. More than 60 percent of the market utilizes polyester-based coatings, which are equipped to withhold a measurable amount of standard outdoor environments such as corrosion and ultra-violet light exposure. Depending on the specifications these powder coatings are available in a wide gloss range from high-gloss to dull-matte finish. Furthermore it is known that Fluoropolymer based powder coatings have a very high chemical and UV resistance. But up to now no suitable solution is known to make a low gloss powder coating based on that kind of materials, especially in a gloss range below 10 and furthermore in particular below 5.

U.S. Pat. No. 9,206,320 relates to a matte-appearance chemical-agent-resistant powder coating composition comprising a resin component, a polyisocyanate-containing uretdione cross-linking agent, a catalyst, and a flattening agent. The resin component may comprise a hydroxyl-containing resin and a hydroxyl-containing halogenated copolymer resin. Catalyzed cross-linking of the uretdione isocyanate groups and resins of the resin component during curing yields a finished-form film with low levels of gloss and sheen and chemical-agent resistance.

EP 2635646 describes matte textured powder monocoat coating compositions comprising a polyester resin, a UV light stabilizer, a matting agent, and a texturing additive, wherein the cured powder coating composition transmits less than about 0.1% of UV light at 290 nm and less than about 0.5% of UV light at 400 nm.

U.S. Pat. No. 4,122,055 relates to an aqueous dispersion type thermosetting coating composition consisting essentially of a homogeneous mixture of an aqueous medium, a powder of a thermosetting resin having an acid value of 5 to 30, a carboxyl group-containing organic polymeric thickener, and an organic amine and/or an alkali metal hydroxide.

GB 1523903 discloses a coating composition which comprises a binder comprising a) the reaction product of an hardenable polyester and a partially blocked polyisocyanate and b) an amount of up to 38.5% by weight of an epoxy resin.

US 2010/0189905 relates to a method of forming a multilayer coating film of excellent appearance by the so-called 3-coat-1-bake system, comprising successively applying onto a coating object, a water-based intermediate paint, water-based base paint and a clear paint; and then simultaneously heat-curing the resulting 3-layered coating film.

WO 2015/005434 provides a coating material composition containing (A) a hydroxyl-containing acrylic resin, (B) a hydroxyl-containing polyester resin, (C) a color pigment and/or a photoluminescent pigment, and (D) a polyisocyanate compound, wherein the hydroxyl-containing polyester resin (B) has a hydroxyl value of 20-250 mg KOH/g and is obtained by reacting a polybasic acid and a polyhydric alcohol including a cyclic polyol compound (b 1) having a nurate structure, and the solid content of the hydroxyl-containing polyester resin (B) is 5-60% by mass based on the total resin solids of the (A) and (B) components.

U.S. Pat. No. 6,825,258 describes a powder coating additive composition containing (a) a non-crosslinked product made by the reaction of an organic alcohol and a carboxylic acid or a reactive equivalent of the carboxylic acid; the product containing at least one ester functionality and at least one hydrocarbyl group of about 10 to about 100 carbon atoms; and (b) a fluoropolymer. The cured coatings exhibit lower coefficient of friction and substantial gloss retention.

US 2012/0270055 relates to a process for making highly mechanical and chemical resistant ceramic substrates, comprising coating said substrates with a base coat layer of a thermosetting or radiation curable powder coating composition, curing the applied powder coating composition, and applying a further layer of a liquid coating composition and curing the composition by exposure to heat.

U.S. Pat. No. 7,034,075 is directed to a low gloss powder coating composition comprising a first component (a) comprising a mixture of (i) at least one glycidyl group-containing acrylic resin having epoxide equivalent weight of from about 250 to about 1500 and glass transition temperature of from about 30° C. to about 80° C.; and (ii) a curing agent, and a second component (b) comprising at least one carboxyl-group containing material having acid number of from about 10 to about 300 and is not substantially compatible with the first component (a). The two components are dry-blended to obtain the powder coating composition.

U.S. Pat. No. 7,816,421 describes a radiation curable powder coating composition for preparing low gloss coatings, comprises as a binder a mixture of 30 to 90 weight % of one or more (meth)acryloyl group containing amorphous polyester resins having an unsaturated equivalent weight of more than 700 g/double bond and 10 to 70 weight % of one or more (meth)acryloyl group containing acrylic copolymers having an unsaturated equivalent weight of less than 700 g/double bond.

U.S. Pat. No. 5,104,955 relates to acrylic-modified hydroxy-functional polyester reactive diluents which may be copolymerized with one or more acrylic monomers, and blended with a variety of thermosetting or thermoplastic film-forming polymers. These blends of the film-forming polymers and the hydroxy-functional polyester diluents can be crosslinked with conventional crosslinking agents such as isocyanates and used in the formulation of low VOC paint compositions particularly useful as automotive topcoats.

EP 1316593 discloses a coating powder composition comprising a mixture of a first film-forming system comprising a GMA resin, a curing agent, and a catalyst; and a second film-forming system comprising a carboxyl terminated polyester, an acrylic resin, and a catalyst.

U.S. Pat. No. 8,969,577 relates to curable compositions comprising a thermolatent amidine base and an organic material which is polymerizable or crosslinkable with a basic or nucleophilic catalyst. In particular, the document relates to curable coating compositions, especially powder coating compositions, and curable adhesive compositions, as well as to the use a thermolatent amidine base as a curing catalyst for thermally induced base-catalyzed polymerization or crosslinking reactions.

U.S. Pat. No. 9,012,556 describes a powder coating composition consisting essentially of (a) a first hydroxyl functional acrylic powder resin having a hydroxyl value of at least about 180; (b) a second hydroxyl functional acrylic powder resin having a hydroxyl value less than about 45; (c) a crosslinker reactive with the hydroxyl functional acrylic resins; and (d) wollastonite; wherein the weight ratio of the first acrylic powder resin to the second acrylic powder resin is greater than 1.0.

It is known that powder coatings based on crosslinkable fluoropolymers or fluorocopolymers can achieve outstanding weather and chemical resistance. However, the need of such a powder coating with low gloss levels (below 30) could not be solved sufficiently. The present invention offers a solution to create a fluoropolymers or fluorocopolymers based powder coating with a gloss level below 30, even down to a gloss level of below 5. With this low gloss level the present invention allows the use of this powder coating even for military applications.

SUMMARY OF THE INVENTION

This invention relates to a curable, matte, preferably dull-matte, powder coating composition, accommodating superior chemical resistance through a unique and innovative complex of cross linkable fluoro containing organic compounds (A), preferably fluoro containing oligomers and/or polymers, and one or more cross linker(s) (B) able to react with (A), wherein the powder coating formulation additionally comprises one or more compound(s) (C) able to react with (A) and/or (B).

This invention provides a system which shows a high chemical resistance in combination with good mechanical flexibility. This formulated invention ultimately yields a cutting edge powder coating that enables any coated surface to sustain durability in vast environments and to resist absorption of chemical, biological and decontaminating reagents if and when exposed to. In special and preferred versions of the present invention the final powder coating material can even lead to coated surface with such an improved resistance to chemical, biological and decontaminating reagents, e.g., mustard gas that the specification MIL-PRF-32348 could be fulfilled.

DETAILED DESCRIPTION OF THE INVENTION

Slight variations above and below the given ranges can be used to achieve substantially the same results. The subject matter of the present invention is characterized by the accompanying claims, in which every combination of one or more subclaims to a specific independent claim is also meant to be explicitly disclosed, even if such a subclaim is, for formal reasons, only referring to one specific other claim.
Fluor Compound The fluoro containing organic compounds (A) mentioned hereinafter are preferably fluoro-resins with functional groups suitable to react with the crosslinkers (B) and (C) according to the present invention. Such kind of materials are for example FEVE and they are known under the trade name Lumiflon.
Crosslinkers The powder coating composition according to the present invention further comprises one or more crosslinker(s) able to react with the functional groups of the polyester and/or acrylic resins used, such as blocked isocyanates, uretdiones, cyclic-amide and/or multi-acid compounds to name a few. For a better chemical stability blocked isocyanates are preferred compared to blocked uretdiones. Also glycolurile are suitable option in such cases. Such a combination according to the present invention taken alone can produce a chemical resistant powder coating with gloss values ≤25, in particular ≤10 measured at a 60° angle. Critically defined by the combination of (A) and (B), the invention at hand has the ability to provide a powder coating, that is able to create a dull-matte finish with a gloss value under 10, measured at 60°. With the addition of other raw materials, the measured gloss value may vary accordingly, in either direction. Suitable crosslinkers are well known in the field and are for example listed in U.S. Pat. No. 9,012,556 and or in U.S. Pat. No. 9,206,320.

In some embodiments of the invention, a blocked cycloaliphatic polyisocyanate is used as crosslinker. In one embodiment, ε-caprolactam blocked trimethylolpropane 4,4'-methylene dicyclohexyl diisocyanate (H12MDI) adduct, with a Tg of 55° C., is used. In particular a blocked cycloaliphatic polyisocyanate should have an NCO % of about 14.0, contain a functionality of 2.2, and have a Tg value near or about 60° C. In another embodiment of the present invention a ε-caprolactam blocked trimethylolpropane isophorone diisocyanate adduct, which should contain a cyclic amide or caporic acid, having a Tg value of or near 52° C., is used to crosslink hydroxyl functional groups of the used fluor polymer.

In a further embodiment of the present invention the hardener (C) in the system comprises one or more carboxylic acid(s) and/or salt(s) of carboxylic acid(s) containing hardeners present in a weight-concentration of below or equal to 50%, preferably below or equal to 20% and most preferably below or equal to 15% of (C). Surprisingly it was found that adding that kind of material into the hardener system (C) allows further gloss reductions even at an already low level of gloss.

Especially the combination of dicarboxylic acids such as nonanedioic acid, decanedioic acid, undecanedioic acid preferably dodecanedioic acid with a combination of 1,2,4,5 benzenetetracarboxylic acid with 2-phenyl-2-imidazoline pyromellitate (1:1) (CAS 54553-90-1) was preferred as use of such a combination showed an additional gloss reduction even at a gloss level in the range below 3 (measured at 60° angle).

In a special embodiment of the present invention the combination from dicarboxylic acids such as nonanedioic acid, decanedioic acid, undecanedioic acid preferably dodecanedioic acid with melamine was also surprisingly found to have an addition gloss reduction effect at very low gloss levels in the range below 3 (measured at 60° angle).

Surprisingly, in case of using melamine as component (C) and isocyanates as component (B) it was also found by IR investigations that the aromatic $NH_2$-group of melamine seemed to be able to react with the isocyanate after treatment at 200° C.
Pigments and Fillers Depending on the color and the associated pigment volume concentration, different filler types, for further gloss reduction, can be used, which fillers are commonly known in the field of powder coatings. However, coarse barium sulfate, preferably Kaolinite in combination with rheological modifiers, such as derivatives of smectite clay were found to have a very effective gloss reduction effect.

The utilization or non-utilization of pigments, whether organic- or inorganic-based, can be implemented into the president invention, also regarding the requirements of the MIL-PRF-32348 specification. Such suitable/non-suitable pigments include, but are not limited to titanium dioxides, antimony oxides, chromium oxides, zinc oxides, calcium carbonates, fumed cilicas and zinc phosphates, to name a few. In addition, different forms of fillers, including, but not limited to barium sulfates, calcium carbonate, and/or baryates, can be used as well.

Additives:

In the present invention, flow control agents may be added to the formulation in an amount of preferably from 0-15 percent by weight of the total powder composition. In one embodiment, a carboxyl functional acrylic polymer product—which has been converted into free-flowing powder by adsorption onto silica-type carrier—provides excellent recoatability, clarity and appearance.

Degassing Agents:

As degassing agents benzoin is preferred. an alternatives can be Powdermate 542 DG from Estron Chemical.

Production of the Powder Coating:

The powder coatings according to the present invention can be produced by standard production procedures well known in the art, such as extruding the components of the coating composition, grinding of the cooled extrudate to a suitable particle size and applying the coating powder to suitable substrates. The application can be performed using any method available, e.g., using electrostatic spraying guns, or by using a fluidized bed.

For some embodiments it might be useful to produce two separate powder coatings, however based on the experiments with the powder coating according to the present invention low gloss levels up to below 1 can even be achieved via a so called one component system.

The substrate to be coated can be provided at ambient or at an elevated temperature.

The powder coating according to the present invention can principally be cured at a broad temperature range of about 130° C.-250° C. for 5 to 50 min. However, a preferred curing cycle is 15 min at 200° C. If necessary, the substrate can be pretreated by common means known in the art like sand-blasting, conversion coating etc., and/or one or more primer coatings can be applied before the substrate is coated with the coating composition according to the present invention described herein.

EXAMPLES

The foregoing is illustrative of the present invention and is not to be construed as limiting thereof. Although a few exemplary embodiments of this invention have been described, those who are experienced in the field of interest will readily appreciate that an exceptional amount of modifications are possible in the exemplary embodiments; not straying from the core techniques and advantages of this invention. In addition, the current invention is not limited to all such modifications and embodiments disclosed.

If not otherwise stated, the powder coatings shown in the examples were produced via the following route.

Blending: Pilot 3 by Thermo Prism—After weighing together the compounds of the formulation it was blended with 1000 RPM for 1 min.

Extruder: Twin screw Extruder ZSK 18 by Coperion.
Temperature Zones: 60, 80, 100, 120, 120 [° C.].
Screw configuration: Standard configuration for powder coatings as known by persons skilled in the art.
Feeder: Torque 30-40% at 600 RPM
Milling: ICM 2.4—The chips for the milling should be approximately 1 $cm^3$ or smaller to guarantee a good transportation inside the mill. The temperature of the air inside the mill should not exceed 15° C. because the particles may be stuck on the lower half of the cyclone wall. The speed of the mill must be set high enough for the almost thermoplastic chips to break, the particles thus obtained need to be small enough to produce a closed surface.

Particle size distribution: PSD Measuring instrument: Mastersizer 2000
Dry-Dispers unit: Scirocco 2000
After milling, an uppercut at 100 μm should be made to prevent defects on the surface. The PSD was measured with 3.5 bar to rip apart particles that may have built agglomerates.

| | |
|---|---|
| 10 μm | 13-20% |
| 20 μm | 34-42% |
| 32 μm | 50-60% |
| 65 μm | 80-90% |
| 100 μm | 99% |
| d(0, 1) | 5-8 μm |
| d(0, 5) | 26-32 μm |
| d(0, 9) | 54-68 μm |

Spaying behavior: After sieving the powder, an anticaking agent (aluminumoxid 0.2%) should be mixed into the formulation. The particles will build less agglomerates and a better electrostatic charge could also be observed.

Spraying: Optitronic—Pistol control unit by Gema—After a lot of sprayed probes, the following custom setting has been found that proved to provide excellent results for CARC formulations.

| | | |
|---|---|---|
| High voltage | [kV] | 45 |
| Current | [μA] | 20 |
| Powder output | [$Nm^3$/h] | 90 |
| Airflow | [$Nm^3$/h] | 2.5 |
| Curing condition | | 200° C./10 min |

DS2 Test Method (Chemical resistance test): The chemical resistance test with the DS2 contaminating agent simulates the Army Research Laboratory (ARL) methodology for contamination, against chemical warfare agents (CWA).

DS2 will neutralize all known toxic chemical agents.

The DS2 contamination agent contains 70% diethylenetriamine, 28% ethylene glycol monomethyl ether and 2% sodium hydroxide (3N).

One drop (1 to 2 mL) of the DS2 reagent was added to the surface of the final powder coating, the surface was covered with a watch glass and the DS2 reagent attacked the surface for 30 minutes at room temperature. The DS2 reagent was washed off with water. The evaluation criteria for testing results are no brightening and swelling. Numerical valuations ranging from 1 to 3 were assigned. 1 is the best performance and 3 the poorest. To get rate 1, no surface changes were visible, for rate 2 only slight surface changes were visible (such as subtle brightening), for rate 3 strong brightening occurred.

Flexibility: Determination of flexibility was made in accordance with ASTM 0522, method B, using a 1.4 inch mandrel. The coating was sprayed, according to manufacturers' recommendations, on a steel panel, tinplated 0.010 inches (0.0254 cm) thick. The coating was examined for cracks over the area of the bend.

Examples

| Raw material | 1 | 2 | 3 | 4 | 5 (comp.) | 6 (comp.) | 7 (comp.) |
|---|---|---|---|---|---|---|---|
| Lumiflon LF-710F | 54.00 | 54.00 | 54.00 | 54.00 | 54.00 | 75.92 | 54 |
| Crelan NW 5 | 15.00 | 15.00 | 15.00 | 15.00 | 15.00 | 20.72 | 15 |
| Melamin | | 1.00 | 1.00 | 3.00 | | | |
| Dodecandioic acid DDDA | 1.00 | | 1.00 | 3.00 | | | |
| RB 68 | 1.00 | 1.00 | | | | | |
| Lanco Wax TF 1890 | | | | | | | 1 |
| Benzoin | 0.70 | 0.70 | 0.70 | 0.70 | 0.70 | | 0.7 |
| Raven 2000 Black Pigment | 0.99 | 0.99 | 0.99 | 0.99 | 0.99 | 0.99 | 0.99 |
| Bayferrox 316 Lanxess Inorganic Pigments, Germany | 2.37 | 2.37 | 2.37 | 2.37 | 2.37 | 2.37 | 2.37 |
| Portafill A40 | | | | | 26.94 | | |
| China Clay | 24.94 | 24.94 | 24.94 | 20.94 | | | 25.94 |
| Sum | 100 | 100 | 100 | 100 | 100 | 100 | 100 |
| Gloss at 20°/60°/85° | 0.9/10/18 | 0.8/8/14 | 0.7/7/12 | 0.8/8/15 | 4/27/66 | 35/67/88 | 1.3/15/25 |

For more details on the suppliers of the raw materials see sample 8, 9, and 10.

Sample 1 shows a formulation which shows the principle combination of a fluor-containing resin and an additional hardener DDDA and RB68 according to the present invention. As can be seen, this kind of formulation already has led to a gloss of 10 at 60° even without any structuring agent. In comparison thereto, the samples 5, 6 and 7 marked "comp." (which are for comparative reasons and not according to the present invention) show a higher gloss level of 27, 67 and 15 measured at 60°. The comparison of samples 5 and 6 shows the effect of the filler on the gloss in powder coating formulations, leaving out the filler led to a strong increase in the gloss level. Additionally, it was surprisingly found that also the type of the filler has an enormous effect on the gloss level (comparison of samples 5 and 7). However, to come to very low gloss levels—especially below 10—the addition of additional hardeners in curable fluoropolymer containing powder coatings according to the present invention was surprisingly suitable. Samples 2 and 3 show that surprisingly the use of melamine additionally led to a reduction of the gloss. Increase of the concentration of the additional hardeners did not led to a further reduction in the gloss in sample 4. It was found that high concentration of additional hardeners, like DDDA, could lead to a reduction in storage stability.

Very good results of gloss and mechanical features as well as of the chemical stability were found with the following three formulations 8, 9 and 10. Therefore, these formulations are even suitable for military applications. To get to a desired gloss levels below 2 or even below 1 in formulations like 9 and 10, which showed a high level of pigment concentration, it was surprisingly found that the use of a special filler based on smectite, like Bentone SD-3, provided such desired levels. Based on that kind of formulations it was surprisingly found that the combination of more hardeners led to a further decrease of gloss as can be seen in the following table:

| Additional Hardener | Wt %/Ratio | Gloss@60° | Gloss@85° |
|---|---|---|---|
| DDDA | 0.9 | 1.7-1.2 | 2.5-1.9 |
| Melamine/PIP | 1.0/2.7 | 0.8 | 1.1 |
| Melamine/DDDA | 1.0/0.9 | 0.7 | 0.1 |

| | | |
|---|---|---|
| DDDA | Dodecanedioic Acid | CAS No. [693-23-2] |
| PIP | 2-Phenyl-2-Imidazoline-pyromellitate | CAS No. [54553-90-1] |
| Melamine | Melamine | CAS No. [108-78-1] |

Sample 8

| No. | Constituent/Source | Description | Wt % |
|---|---|---|---|
| 1 | Fluorocopolymer Lumiflon LF-710F AGC Chemicals Americas, Inc. | FEVE (Fluoroethylene-Alky Vinyl Ether) copolymer with a hydroxyl value of 46 mg KOH/g | 54.00 |
| 2 | Crelan NW 5 Covestro AG Leverkusen, Germany | Blocked cycloaliphatic polyisocyanate with a total NCO content of 12.7% | 15.00 |
| 3 | Melamine in combination with DDDA Borealis Agrolinz Melamine GmbH, Austria | Melamine CAS No. [108-78-1] with an EW of 42 g/Eq | 1.00 |
| 4 | DDDA in combination with Melamine Invista, Germany | Dodecanedioic acid CAS No. [693-23-2] with an EW of 115 g/Eq | 0.90 |
| 5 | Lanco 1890 N Lubrizol Ltd, UK | Fluoroethylene based agent CAS No. [9002-84-0] | 1.00 |
| 6 | Resiflow P-64F Worlee Chemie Estron Chemicals, Germany | Carboxyl functional acrylic flow control agent | 1.00 |
| 7 | Benzoin | Benzoin CAS No. [119-53-9] | 0.70 |
| 8 | Raven 2000 Black Columbian Chemicals Company, Georgia | Furnace carbon black (C.I. Pigment Black 6) CAS No. [1333-86-4] | 0.99 |
| 9 | Bayferrox 316 Lanxess Inorganic Pigments, Germany | Iron oxide (C.I. Pigment Black 11) CAS No. [1317-61-9] | 2.37 |
| 10 | China Clay Extra ST Kamig AG, Austria | Kaolinite CAS No.[00-1332-58-7] | 23.04 |
| Total | | | 100.00 |

Sample 9

| No. | Constituent/Source | Description | Wt % |
|---|---|---|---|
| 1 | Fluorocopolymer Lumiflon LF-710F AGC Chemicals Americas, Inc. | FEVE (Fluoroethylene-Alky Vinyl Ether) copolymer with a hydroxyl value of 46 mg KOH/g | 54.00 |
| 2 | Crelan NW 5 Covestro AG Leverkusen, Germany | Blocked cycloaliphatic polyisocyanate with a total NCO content of 12.7% | 15.00 |
| 3 | Melamine in combination with DDDA Borealis Agrolinz Melamine GmbH, Austria | Melamine CAS No. [108-78-1] with an EW of 42 g/Eq | 1.00 |
| 4 | DDDA in combination with Melamine Invista, Germany | Dodecanedioic acid CAS No. [693-23-2] with an EW of 115 g/Eq | 0.90 |
| 5 | Lanco 1890 N Lubrizol Ltd, UK | Fluoroethylene based agent CAS No. [9002-84-0] | 1.00 |
| 6 | Resiflow P-64F Worlee Chemie Estron Chemicals, Germany | Carboxyl functional acrylic flow control agent | 1.00 |
| 7 | Benzoin | Benzoin CAS No. [119-53-9] | 0.70 |
| 8 | Duropal Yellow 6218 Habich, Austria | Bismuth vanadate (C.I. Pigment Yellow 184) CAS No. [14059-33-7] | 0.65 |
| 9 | Bayferrox 943 Lanxess Inorganic Pigments, Germany | Iron Oxide (C.I. Pigment Yellow 42) CAS No. [20344-49-4] | 2.35 |
| 10 | Colortherm Green GN Lanxess Inorganic Pigments, Germany | Chromium oxide (C.I. Pigment Green 17) CAS No. [1308-38-9] | 5.95 |
| 11 | Bayferrox 316 Lanxess Inorganic Pigments, Germany | Iron oxide (C.I. Pigment Black 11) CAS No. [1317-61-9] | 3.00 |
| 12 | Kronos 2310 Kronos International Inc. | Rutile Titanium Dioxide (C.I. Pigment White 6) CAS No. [13463-67-7] | 0.22 |
| 13 | Bentone SD-3 Elementis Specialties | Organic derivative of a smectite clay CAS No. [121888-67-3] | 2.00 |
| 14 | China Clay Extra ST Kamig AG, Austria | Kaolinite CAS No. [00-1332-58-7] | 12.23 |
| Total | | | 100.00 |

Sample 10

| No. | Constituent/Source | Description | Wt % |
|---|---|---|---|
| 1 | Fluorocopolymer Lumiflon LF-710F AGC Chemicals Americas, Inc. | FEVE (Fluoroethylene-Alky Vinyl Ether) copolymer with a hydroxyl value of 46 mg KOH/g | 54.00 |
| 2 | Crelan NW 5 Covestro AG Leverkusen, Germany | Blocked cycloaliphatic polyisocyanate with a total NCO content of 12.7% | 15.00 |
| 3 | Melamine in combination with DDDA Borealis Agrolinz Melamine GmbH, Austria | Melamine CAS No. [108-78-1] with an EW of 42 g/Eq | 1.00 |
| 4 | DDDA in combination with Melamine Invista, Germany | Dodecanedioic acid CAS No. [693-23-2] with an EW of 115 g/Eq | 0.90 |
| 5 | Lanco 1890 N Lubrizol Ltd, UK | Fluoroethylene based agent CAS No. [9002-84-0] | 1.00 |
| 6 | Resiflow P-64F Worlee Chemie Estron Chemicals, Germany | Carboxyl functional acrylic flow control agent | 1.00 |
| 7 | Benzoin | Benzoin CAS No. [119-53-9] | 0.70 |
| 8 | Colortherm Yellow 10 Lanxess | Iron Oxide (C.I. Pigment Yellow 42) CAS No. [51274-00-1] | 0.83 |
| 9 | Bayferrox 3920 Lanxess | Iron Oxide (C.I. Pigment Yellow 42) CAS No. [51274-00-1] | 1.13 |
| 10 | Bayferrox 130 B Lanxess | Iron Oxide (C.I. Pigment Red 101) CAS No. [1309-37-1] | 0.41 |
| 11 | Colortherm Green GN Lanxess | Chromium Oxide (C.I. Pigment Green 17) CAS No. [1308-38-9] | 1.00 |
| 12 | Kronos 2310 Kronos International Inc. | Rutile Titanium Dioxide (C.I. Pigment White 6) CAS No. [13463-67-7] | 12.83 |
| 13 | Bentone SD-3 Elementis Specialties | Organic derivative of a smectite clay CAS No. [121888-67-3] | 2.00 |
| 14 | China Clay Extra ST Kamig AG, Austria | Kaolinite CAS No. [00-1332-58-7] | 8.20 |
| Total | | | 100.00 |

Gloss Results of Samples 8-10

| Gloss | 8 | 9 | 10 |
|---|---|---|---|
| 20° | 0.1 | 0.2 | 0.8 |
| 60° | 0.9 | 0.6 | 1.1 |
| 85° | 1.3 | 0.7 | 0.7 |

Chemical Resistance Results of Samples 10-15 According to the DS2 Test

| 8 | 9 | 10 |
|---|---|---|
| Value 1 | Value 1 | Value 1 |

Mechanical Results According to ASTM 0522, Method B, Using a 1.4 Inch Mandrel

| 8 | 9 | 10 |
|---|---|---|
| passed | passed | passed |

What we claim is:

1. A curable powder coating composition comprising one or more cross-linkable fluoro containing organic oligomer(s) and/or polymer(s) (A), one or more crosslinker(s) (B) able to react with (A), one or more compound(s) (C) able to react with (A) and/or (B), and melamine and/or a melamine derivative; wherein the one or more crosslinker(s) is distinct from the melamine and the melamine derivative.

2. The powder coating composition of claim 1, wherein a weight-ratio of (C)/(B) is between 0.01 and 1.0.

3. The powder coating composition of claim 2, wherein the weight-ratio of (C)/(B) is between 0.05 and 0.4.

4. The powder coating composition of claim 1, wherein (C) comprises free carboxylic acid groups.

5. The powder coating composition of claim 4, wherein (C) comprises more than one free carboxylic group.

6. The powder coating composition of claim 1, wherein (C) comprises dodecanedioic acid and/or a pyromellitic group.

7. The powder coating composition of claim 1, wherein (B) comprises an isocyanate based crosslinkers and/or a uretdione group.

8. The powder coating composition of claim 7, wherein (B) comprises blocked isocyanate based crosslinker.

9. The powder coating composition of claim 1, further comprising one or more phyllosilicate in a total phyllosilicate weight-concentration of between 3 and 30 weight percent based on overall powder coating formulation.

10. The powder coating composition of claim 9, wherein the phyllosilicate comprises at least one china clay, smectite clay, and/or derivative of either.

11. The powder coating composition of claim 10, wherein phyllosilicate comprises an organic derivatives of a china clay or a smectite clay.

12. A coating made with a powder coating composition of claim 1 and having a gloss below 30, measured at 60°.

13. The coating of claim 12, further defined as having a gloss below 15, measured at 60°.

14. The coating of claim 13, further defined as having a gloss below 5, measured at 60°.

15. A method of producing a powder coated item comprising:
   obtaining a powder coating composition of claim 1; and
   using the powder coating composition to powder coat an item.

* * * * *